United States Patent [19]

Buford

[11] Patent Number: 4,634,479

[45] Date of Patent: Jan. 6, 1987

[54] POWER SOURCE UTILIZING ENCAPSULATED LITHIUM PELLETS AND METHOD OF MAKING SUCH PELLETS

[75] Inventor: John T. Buford, Winnebago, Ill.

[73] Assignee: Sundstrand Corporation, Rockford, Ill.

[21] Appl. No.: 618,893

[22] Filed: Jun. 8, 1984

[51] Int. Cl.$^4$ .......................... C06B 45/32; B05D 7/00
[52] U.S. Cl. ........................................ 149/6; 149/19.3; 427/216; 427/318
[58] Field of Search ............... 428/407, 463; 149/19.3, 149/6; 427/216, 318; 264/7, 13, 15

[56] References Cited

U.S. PATENT DOCUMENTS

| | | | |
|---|---|---|---|
| 3,351,505 | 11/1967 | Shapiro et al. | 149/19.3 |
| 3,379,178 | 11/1968 | Boyars et al. | 122/127 |
| 3,441,455 | 4/1969 | Woods et al. | 149/19.3 |
| 3,565,706 | 2/1971 | Waite | 149/19.3 |
| 3,788,906 | 1/1974 | Schroeder | 149/6 |
| 3,791,889 | 2/1974 | Schroeder | 149/19.3 |
| 3,963,541 | 6/1976 | Biermann et al. | 149/19.3 |

FOREIGN PATENT DOCUMENTS

| | | | |
|---|---|---|---|
| 7308416 | 12/1973 | Netherlands | 149/19.3 |
| 1006753 | 10/1965 | United Kingdom . | |

Primary Examiner—John D. Smith
Assistant Examiner—Janyce A. Bell
Attorney, Agent, or Firm—Wood, Dalton, Phillips, Mason & Rowe

[57] ABSTRACT

Encapsulated lithium including a shot shaped and sized body (10) of lithium metal encapsulated in a thin layer (12) of a predominantly fluorine substituted polyolefin based polymeric material, a method of making the same and a power plant utilizing the encapsulated lithium as fuel (FIG. 3).

5 Claims, 3 Drawing Figures

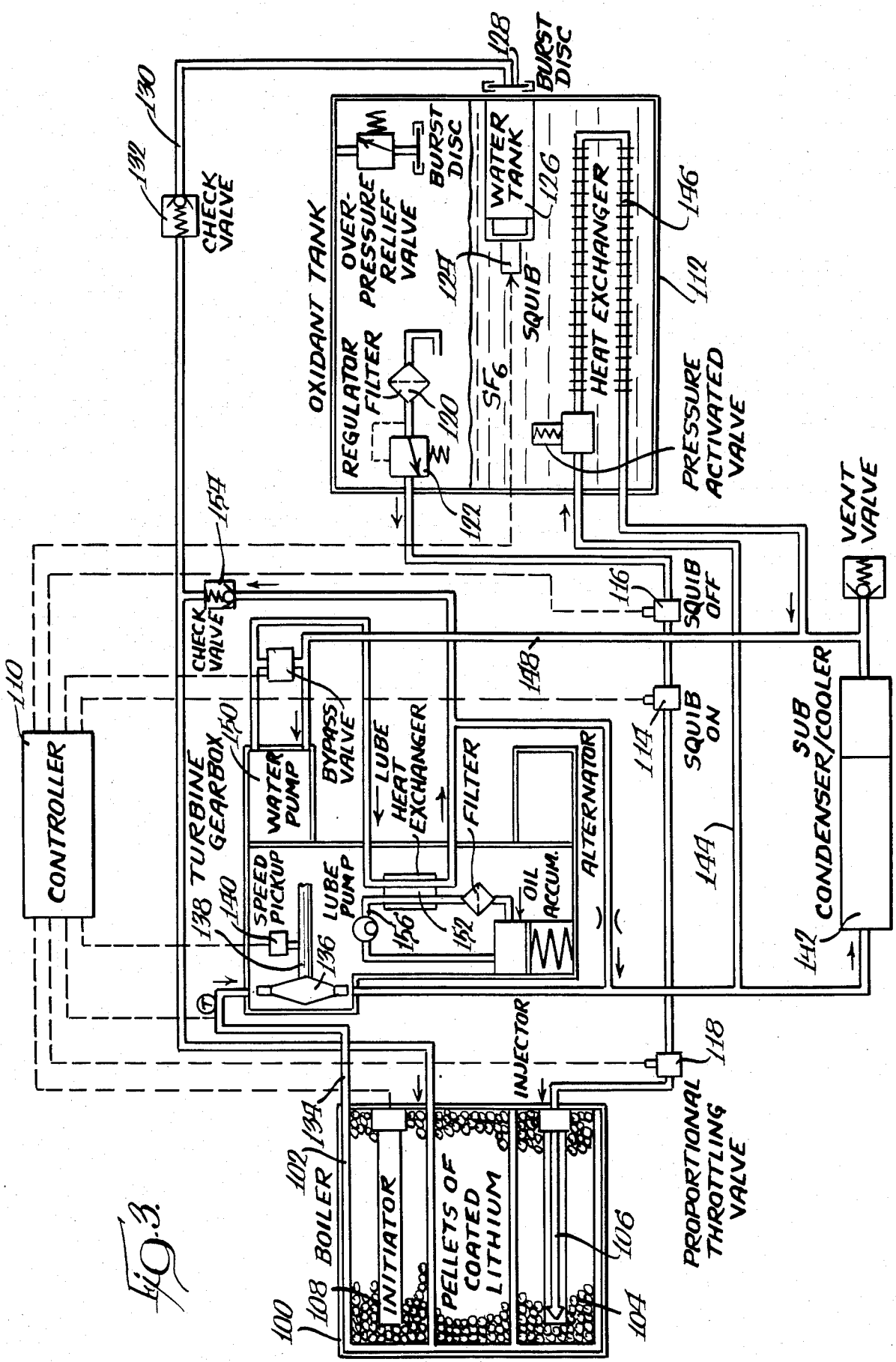

POWER SOURCE UTILIZING ENCAPSULATED LITHIUM PELLETS AND METHOD OF MAKING SUCH PELLETS

FIELD OF THE INVENTION

This invention relates to a power or heat source wherein lithium pellets encapsulated in a predominantly fluorine substituted polymeric material are oxidized to provide heat, encapsulated lithium pellets, and a method of making such encapsulated pellets.

BACKGROUND ART

Over the years, a variety of power or energy sources operating off of heat derived from the oxidation of metallic lithium have been proposed. See, for example, U.S. Pat. No. 3,328,957 issued July 4, 1967 to Rose. In such a system, water and lithium are reacted to produce lithium hydroxide, hydrogen and steam. Elsewhere in the system, the hydrogen generated by the reaction between lithium and water is combined with oxygen to provide additional steam. The steam is then utilized to drive a turbine or the like to provide a source of power.

More recently, somewhat similar systems have been proposed wherein metallic lithium, in the solid phase, is placed within a boiler. When power is desired, the lithium is melted and oxidized with sulfur hexafluoride. The resulting heat vaporizes a working fluid, typically water, in a working fluid chamber in heat exchange relation with the oxidation chamber of the boiler. Again, a turbine may be driven by the working fluid.

While the latter system is effective, it is not without its drawbacks. In the usual case, the system start is initiated by firing a thermal starting device employing aluminum potassium perchlorate. This device is intended to heat the thermal mass of the boiler and the lithium fuel therein to operating temperature. The aluminum potassium perchlorate utilized generates extremely high temperatures, typically in the range of 5400°-8500° F. and must be pelletized and closely packed to propagate ignition of the system. To achieve such, core holes are provided in the lithium which are filled with the aluminum potassium perchlorate and a squib provided within the core hole. The core is then sealed with a lithium plug. Substantial pressures may be generated during the ignition of the aluminum potassium perchlorate requiring high strength of the boiler structure. Moreover, if the aluminum potassium perchlorate, while undergoing oxidation, contacts boiler surfaces it can burn through parts of the boiler damaging the system. It may also burn through or damage nozzles employed to inject sulfur hexafluoride into the reaction mass. Again, damage to the system can occur.

Furthermore, if the squib is not properly placed or otherwise inoperative, initiation of system operation may fail to occur.

The present invention is directed to overcoming one or more of the above problems.

Prior art of possible relevance, in addition to that identified above, includes Chemical Abstracts, Vol. 70, 1969 at page 34, item 120326(c) and the following U.S. Pat. Nos. 3,843,557 issued Oct. 22, 1974 to Fanger et al; 3,909,444 issued Sept. 30, 1975 to Anderson et al; and 4,016,099 issued April 5, 1977 to Wellman et al.

SUMMARY OF THE INVENTION

One principal object of the invention is the provision of a new and improved power source employing lithium as a fuel.

Another object of the invention is the provision of a lithium fuel comprised of metallic lithium pellets encapsulated in a coreactant in the form of a predominantly fluorine substituted polymeric material that will be stable at the temperatures to which the fuel may be typically subjected.

Still another object of the invention is the provision of a method of making such a pelletized fuel.

The invention achieves the foregoing objects through the provision of an encapsulated lithium fuel comprising a shot shaped and sized body of lithium metal encapsulated in a thin layer of a predominantly fluorine substituted polyolefin based polymeric material bonded thereto.

In a preferred embodiment of the invention, the lithium pellets have a nominal diameter of 1-25 millimeters.

The lithium metal may constitute at least 60 wt. % of the encapsulated lithium and the polymeric material may be coated directly on the lithium metal.

The polymeric material may be selected from the group consisting of polyperfluoroalkoxys, polytetrafluoroethylene, tetrafluoroethylene telomers, and mixtures thereof.

Another facet of the invention contemplates a method of encapsulation including the step of coating solid phase metallic lithium pellets with a predominantly fluorine substituted polymeric material.

In a preferred embodiment of the invention, the inventive method includes the steps of subjecting lithium metal in the solid phase to a liquid containing the polymeric material and a carrier which is non-reactive with solid lithium and thereafter evaporating the carrier.

Typically, the steps will be performed in an atmosphere inert to lithium metal as, for example, an atmosphere provided by one of the periodic table inert gases such as argon.

According to the method, the subjecting and evaporating steps are performed repeatedly and in sequence until a desired thickness of the polymeric material on the lithium has been built up.

According to one embodiment of the invention, the liquid further includes a diluent to reduce the rate of evaporation of the carrier. The step of subjecting is preferably performed by spraying while the lithium pellets are being agitated.

According to still another facet of the invention, there is provided a heat source including a chamber, a body of lithium pellets in the chamber, the pellets being coated with a predominantly fluorine substituted polymeric material, and an initiator in the body for generating sufficient heat to initiate an oxidation reaction between at least some of the pellets and their respective coatings.

According to a preferred embodiment of the invention, the chamber is an oxidation chamber forming part of a boiler which additionally includes a working fluid chamber in heat exchange relation therewith. Means are connected to the working fluid chamber for conveying heated working fluid therein to a point of use. There is also provided a controllable oxidant inlet for the oxidation chamber and an oxidant supply chamber is connected to the inlet for controlled supply of a lithium oxidant to the oxidation chamber to maintain an oxidation reaction with the lithium once it is initiated.

In a highly preferred embodiment, the ullage volume of the body of lithium is on the order of 20% and the weight percent of the lithium to the total weight of the lithium and coating is at least about 60%. Other objects and advantages will become apparent from the following specification taken in connection with the accompanying drawings.

DESCRIPTION OF THE DRAWINGS

FIG. 3 is a schematic of a preferred embodiment of a power plant utilizing the pelletized lithium fuel.

DESCRIPTION OF THE PREFERRED EMBODIMENTS

Figure 1:
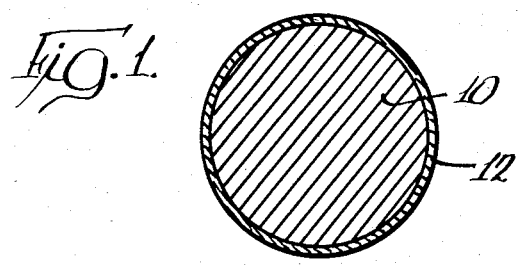
FIG. 1 is a sectional view of an encapsulated lithium fuel pellet made according to the invention.

An exemplary embodiment of a lithium fuel pellet made according to the invention is illustrated in FIG. 1 and is seen to include a shot sized and shaped body 10 of lithium metal encapsulated in a thin layer 12 of a predominantly fluorine substituted polyolefin based polymeric material. The lithium body 10 is nominally spherical in shape and according to a preferred embodiment of the invention will have a nominal diameter in the range of about 1-25 millimeters. The bodies 10 may be formed in any suitable fashion, although given the reactivity of lithium care must be taken. By way of example, one means by which the bodies 10 may be formed is by forming small droplets of molten lithium metal and dropping them through an inert atmosphere into an inert coolant which could be, for example, mineral oil or a liquified inert gas on the periodic table such as argon.

The layer 12 of polymeric material may have varying thickness but will generally entirely encapsulate the body 10. It may be deposited directly on the body 10 or on another coating already applied to the body 10 as desired. The thickness is dependent upon the desired ratio of the polymeric material to the lithium in the final product. Thus, the stoichiometry of the reaction in which the fuel is used, the presence or absence of other oxidants in addition to polymeric material, and other like factors will be determinative of the thickness of the layer 12.

According to preferred embodiments of the invention, the thickness of the layer 12 will generally be 0.060 inches or less and may be as little as 14 microns or less.

Whether another layer of a different material is applied directly to the body prior to the application of the layer 12 or to the layer 12 after its application to the body 10 will in a large part depend upon the desired impermeability of the encapsulating layer 12. Where impermeability is of concern, and the layer 12 is quite thin, another coating material providing the desired impermeability may be employed. In power systems of the type to be described hereinafter, it is generally preferred to avoid the use of an additional layer for the reason that such additional layer, in order to be compatible with the lithium, that is, non-reactive with lithium at typical storage conditions, may have a relatively high hydrogen content which in turn could lead to the generation of undesirably high pressures during the oxidation process.

As mentioned previously, the layer 12 is formed of a predominantly fluorine substituted polyolefin based polymeric material. This will in turn mean that generally speaking, approximately 70-75% or more of the hydrogen atoms of the basic polyolefin will be substituted for by other components, usually fluorine. Typical commercially available materials are those sold under the registered trademark Teflon such as polytetrafluoroethylene and polyperfluoroalkoxy compounds. A particularly preferred compound is that sold under the registered trademark Vydax and specifically, Vydax 550. Such material is understood to be a fluorine end capped tetrafluoroethylene telomer dispersed in a trichlorotrifluoroethane solvent. Such materials are commercially available from E. I. DuPont de Nemours Inc. of Wilmington, Del.

It is believed that most any polytetrafluoro ethylene or similar analogous compound can be employed in forming the layer 12 as far as compatibility, i.e. non-reactivity with lithium at customary storage temperatures, is concerned. In some cases, however, difficulty may occur in applying the layer 12 due to the fact that it must be applied at a temperature below the melting temperature of lithium at approximately 357° F. and preferably below 300° F. to provide a desired safety margin. This may in turn limit the application method to the application of the material in a solvent-like carrier which also must be non-reactive with lithium at the temperature of application; and suitable solvent-like carriers that result in a desired coating to form the layer 12 may not be presently available for all of the operative predominantly fluorine substituted polymeric materials that could be used with efficacy.

Figure 2:
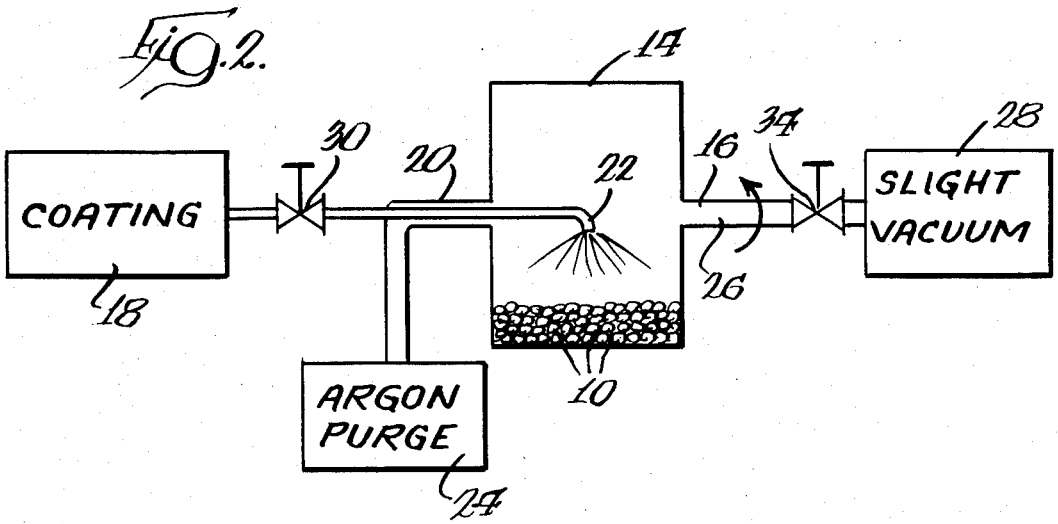
FIG. 2 is a somewhat schematic illustration of an apparatus for encapsulating lithium pellets.

The layer 12 is applied in, for example, an apparatus such as schematically shown in FIG. 2. The same includes a sealed tumbler 14 in which the lithium bodies 10 may be placed and agitated by rotating the tumbler 14 about an axis 16. The coating material from any suitable supply 18 may be directed via a conduit 20 on the rotational axis 16 of the tumbler 14 to the interior thereof and a spray nozzle 22 therein. The spray nozzle 22 sprays the coating material on the bodies 10 while they are being agitated to provide an even coating.

The interior of the tumbler 14 may be provided with an inert gas purge 24. Argon has been found useful for the purpose.

An exit tube 26 on the rotational axis 16 of the tumbler 14 may be connected to a slight vacuum source 28.

In the usual case, the bodies 10 will be agitated through rotation of the tumbler while the coating is sprayed via the spray nozzle 22 thereon. After a desired build-up of the coating on the bodies 10 is achieved, a valve 30 may be closed to terminate the spraying operation. At the same time a valve 34 may be opened to apply a slight vacuum to the interior of the tumbler 14. In the usual case, the vacuum need be only on the order of 3-4 inches of water where a highly volatile solvent, such as trichlorotrifluoroethane is being utilized.

After the solvent has evaporated from the liquid applied to the bodies 10 within the tumbler 14, the valve 34 may be closed and the valve 30 reopened to begin a second spraying step. This procedure may be repeated as often as desired until a desired thickness of the layer 12 on the bodies is achieved.

It is highly desirable that only a slight vacuum be applied to the interior of the tumbler 14 when highly volatile solvents are employed as carriers for the polymeric material. If too great of a rate of evaporation occurs, imperfections in the layer 12 may occur. Thus, by using a relatively slight vacuum, evaporated solvent can be withdrawn from the interior of the tumbler without causing too great a rate of evaporation such that damage to the layer 12 would occur. In some instances, it is further desirable to introduce a diluent into the liquid being sprayed on the bodies 10 to further reduce the rate of evaporation. For example, in the case of a Vydax 550 application, a diluent non-reactive with the lithium such as 1,1,1-trichloroethane may be utilized.

The resulting encapsulated lithium fuel pellets, upon removal from the tumbler 14, will preferably be stored in an inert gas atmosphere utilizing an inert gas on the periodic table such as argon. It is, however, to be noted that the encapsulated fuel pellets will be relatively stable at this point in time so as to allow easy transfer to storage. They may be exposed to air for several minutes without any noticeable reaction occurring. They will also be relatively insensitive to shock.

An exemplary form of a power source in which the encapsulated lithium pellets may be employed as fuel is illustrated in FIG. 3. The same may be utilized as a propulsion source for a torpedo or the like. Alternately, the same could be used as a stored chemical energy electrical generating system for operating an electrical generator or for virtually any other usage where heat generated by the oxidation of the encapsulated lithium fuel pellets can be used with advantage.

In the embodiment illustrated in FIG. 3, there is provided a boiler 100 having a working fluid chamber 102 and an oxidation chamber 104 in heat exchange relation therewith. The working fluid chamber 102 may include a series of tubes disposed within the chamber 104 or any other desired design.

The oxidation chamber 104 is filled with the encapsulated lithium fuel pellets of the present invention and also includes an oxidant injection nozzle 106 and an initiator 108. Preferably, because of the temperatures generated within the boiler 100 after the system has been started up, ullage (void space) will account for approximately 20% of the volume of the oxidation chamber 104. This allows for substantial thermal expansion of lithium fuel pellets upon heating to operating temperature without creating high mechanical pressures on the interior of the boiler due to thermal expansion of the fuel.

The initiator 108 may be any desired heat source that is capable of raising the temperature of the encapsulated lithium fuel pellets in its immediate vicinity to the temperature whereat an oxidation reaction between the lithium and the polymeric coating thereon occurs. As alluded to previously, it is believed that such a reaction begins at the melting point of lithium, that is, 357° F.

At the time the initiator is energized, as by a conventional controller 110, a lithium oxidant is injected into the oxidation chamber 104 via the nozzles 106. According to one embodiment of the invention, the lithium oxidant employed may be sulfur hexafluoride which in turn may be maintained in an oxidant tank 112. Interlocked control valves 114 and 116 are disposed in a line extending from the tank 112 to the nozzle 106. Additionally, a throttling or control valve 118 may be provided in the line so as to control the volumetric flow rate of the sulfur hexafluoride in gaseous form, to the nozzle 106.

In the usual case, the main portion of the sulfur hexafluoride will be maintained in liquid form in the tank 112 and the vapor pressure of the same above the liquid body will be sufficient to drive the sulfur hexafluoride to the system to the nozzle 106 via a filter 120 and pressure regulator 122.

Thus, the oxidation reaction is initiated in the boiler 100 by an oxidation reaction between the lithium and the polymeric material coated thereon. Reaction products will include lithium fluoride and a lithium-carbon compound. The initial oxidation reaction will be almost immediately followed by a further oxidation reaction between the lithium metal and the sulfur hexafluoride with again a lithium fluoride and a lithium sulfide product being formed.

The rate at which the second reaction occurs is controlled by the rate of admission of sulfur hexafluoride to the boiler 104 through operation of the valve 118 by the controller 110.

At the time the system is energized, the controller 110 may detonate an explosive squib 124 associated with a water tank 126 containing water which, in this embodiment of the invention, serves as the working fluid. The increase in pressure will cause a burst disk 128 to rupture and drive water via a conduit 130 through a check valve 132 to the working fluid chamber 102 within the boiler 100. The heat of the oxidation reaction will vaporize the water and the same may exit the boiler via a conduit 134 to be directed to and drive a turbine 136. The turbine has an output shaft 138 which may be coupled to whatever is desired to be driven as, for example, the propellers of a torpedo. Conventionally, a speed sensing pick-up 140 will be associated with the shaft 138 and provide signals to the controller 110 which in turn will operate the valve 118 to achieve a desired speed.

Working fluid exiting the turbine 136 will flow to a condenser and subcooler 142. A fraction of such material may also be passed via a conduit 144 to a heat exchanger 146 within the oxidant tank 112 to heat the oxidant therein to assist in oxidant vaporization. The return flow from the heat exchanger 146 is joined with the outlet stream from the condenser subcooler 142 and by a conduit 148 flows to a water pump 150 which may be driven by the turbine 136. The water is then directed by the pump 150 to a heat exchanger 152 and ultimately returned via a check valve 154 to the working fluid chamber 102 to be revaporized.

The heat exchanger 152 may be utilized to cool lubricating oil in a lubricating system, generally designated 156 for the moving parts of the system.

One advantage of a system made according to the invention resides in the fact that high ignition temperatures are not required thereby eliminating the difficulties found in prior art structures utilizing aluminum potassium perchlorate initiators. Specifically, it is only necessary to raise the temperature of a relatively few pellets to the melting point of lithium; and this is readily accomplished because of the low mass of each individual pellet. Consequently, problems of damaged boiler components are eliminated.

Another advantage of the invention is that high pressures are avoided. Even upon ignition, only a very minimal positive pressure spike is encountered.

The lithium fuel may be easily handled and even where an impermeable coating is not provided on the pellets, noticeable reaction of the lithium with air is not observed over a several minute period.

I claim:

1. Encapsulated lithium based fuel consisting essentially of:

a shot shaped body of metallic lithium having a nominal diameter in the approximate range of 1–25 mm; and a coating encapsulating said body and formed of a thin layer of predominantly fluorine substituted polymeric or telomeric material, said material exothermally reacting with the lithium of said body at temperatures approximately at or above the melting point of lithium.

2. The lithium fuel of claim 1 wherein said material is a tetrafluoroethylene telomer.

3. The lithium based fuel of claim 2 wherein the metallic lithium constitutes about 60–86 weight percent and the telomer constitutes about 40–14 weight percent, said coating having a nominal thickness of about 0.060 inches or less.

4. The encapsulated lithium of claim 1 wherein lithium metal constitutes 60–86 weight percent of the encapsulated lithium.

5. The encapsulated lithium of claim 1 wherein said polymeric material is selected from the group consisting of polyperfluoroalkoxy, polytetrafluoroethylene, tetrafluoroethylene telomers, and mixtures thereof.

* * * * *